March 10, 1964     G. K. DISHMAN     3,124,391
HIGH CAPACITY, COMPACT LANDING GEAR
Filed Aug. 8, 1962     2 Sheets-Sheet 1

INVENTOR.
GUS K. DISHMAN
BY
Agent

INVENTOR.
GUS K. DISHMAN

United States Patent Office 3,124,391
Patented Mar. 10, 1964

3,124,391
HIGH CAPACITY, COMPACT LANDING GEAR
Gus K. Dishman, Van Nuys, Calif., assignor to
Lockheed Aircraft Corporation, Burbank, Calif.
Filed Aug. 8, 1962, Ser. No. 215,659
4 Claims. (Cl. 301—1)

This invention relates to an aircraft landing gear and more particularly to an improved three wheel landing gear assembly.

Prior to this invention there were no known landing gear assemblies employing three wheels mounted on a common axis. Conventional multiple wheel mountings for industrial trucks and the like present considerable difficulties in replacement of a single wheel. Generally, the entire assembly or a substantial part of the assembly must be completely dismantled for servicing.

Modern aircraft are becoming heavier and faster, which, with the incident higher landing speeds and greater landing weights require larger landing gear to absorb the high loading. Heavier landing gear presents many problems in retraction and storage, particularly in the wing areas because of the size of the multiple wheel assemblies. Also, the use of three and four wheel multiple axle bogies are troublesome due to dynamic effects of brake snubbing and wheel shimmy.

It is therefore an important object of this invention to provide a compact high capacity landing gear assembly of highly reliable and serviceable nature.

Another object of the present invention is to provide a high capacity landing gear capable of storage in a minimum enclosure.

A further object of the present invention is to provide a multiple wheel landing gear wherein each wheel is easily removable for servicing.

A further object of the present invention is to provide a multiple wheel landing gear which minimizes brake snubbing action and provides anti-shimmy damping.

Other and further objects of the invention will become readily apparent from the following detailed specification and the accompanying drawings wherein a preferred form of the invention is illustrated, and in which.

Figure 1:
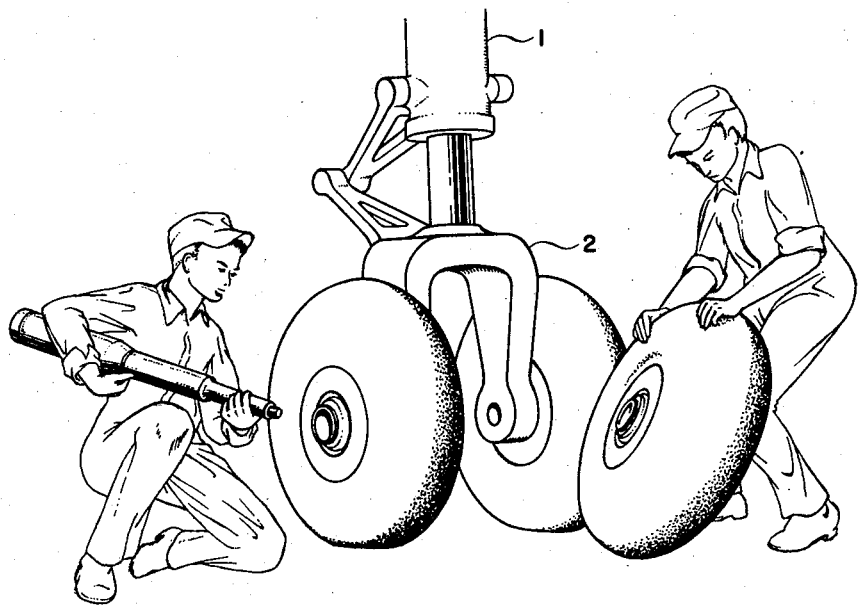
FIGURE 1 is a perspective view of an aircraft main landing gear embodying the features of this invention.

With reference to the drawing, a landing gear strut 1, is pivoted at the top to the aircraft structure in a conventional manner. The lower end of the strut is preferably a one-piece forged fork 2 with outside wheel axles 3 and 4 projecting from the lower ends of each side of the fork. A center bore 5 extends through the axles 3 and 4 and the adjacent forks areas. A center wheel axle 6 in the form of a sleeve is held in place by a tie-rod 7 inserted through the bore and held in place by suitable retaining members 7' and 8. It will be noted that the bore in outside axles 3 and 4 is identical, thus permitting insertion of the tie-rod 7 from either direction.

Figure 2:
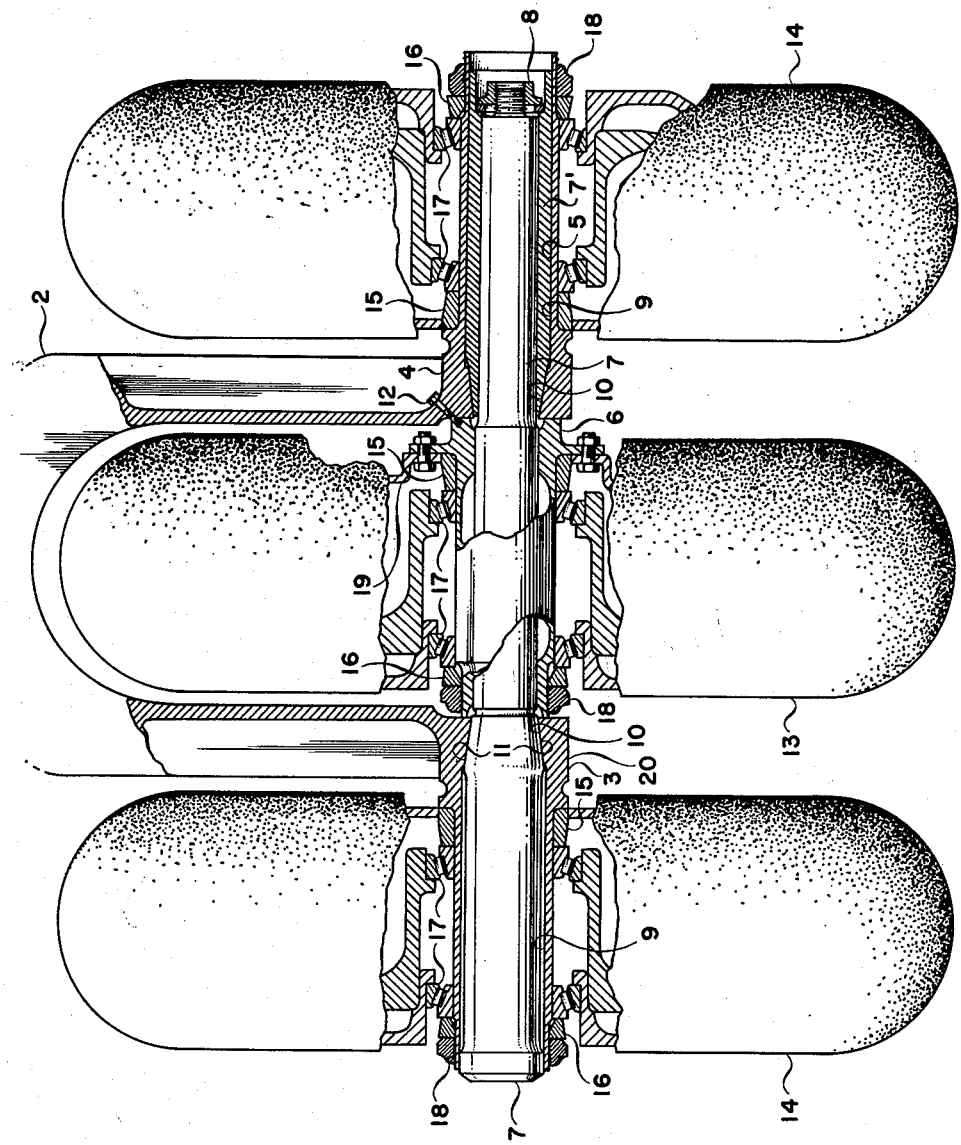
FIGURE 2 is a front elevation of the lower fork and wheel assembly of FIGURE 1 illustrating the details of the invention.

In particular, the internal surfaces of outer axles 3 and 4 have a first straight portion 9 of uniform diameter and a beveled portion 10. The tie-rod 7 is shown, in FIGURE 2, as having been inserted from the left side through the axles 3, 6 and 4 in that order, and the taper 11 of tie-rod 7 mates with the bevel 10 of the left fork-axle assembly. A sleeve-like retaining member 7' is inserted from the other (right) side coaxially around the reduced end of the tie-rod 7, and has a tapered surface mating with the bevel 10 of the right fork-axle assembly. The tie-rod and sleeve are held in essentially an integral condition by means of the nut-washer assembly 8. The center axle 6 is bolted to the fork 2 by means of a structural extension of the axle which is schematically illustrated by the physical connection 12.

Wheel assemblies 13 and 14 are shown as standard wheel, tire and brake assemblies and are individually mounted for ready removal. Each of the wheel assemblies is held on the respective axles by means of the spacers 15, 16, bearing assemblies 17, and the lock nuts 18. In each wheel assembly, the brake torque is transferred to the axle through bolts into a flange or the equivalent of the axle as at 19 and then into the fork 2 as indicated above. Jacking lugs may be provided on the fork such as at 20 to facilitate servicing.

Therefore, it is believed readily apparent that the described invention provides a multiple wheel bogie, wherein any one of the wheels may be easily removed for repair, replacement or servicing without disturbing the remaining wheels. For example, by removing either of the outer lock nuts 18, the associated wheel and bearings are readily removed from the corresponding axle and the other two wheels are left in a secured condition on the respective axles. Also removal of the washer-nut assembly 8 permits withdrawal of the tie-rod 7 and retaining sleeve 7' as illustrated in FIGURE 1, whereupon the center wheel assembly with the axle 7 may be removed by simply unbolting the axle from the fork.

There are many advantages of a multiple wheel assembly embodying the features of the present invention. For one thing, the storage problem is greatly simplified. The preferred configuration as illustrated is compact and may be readily adaptable to fore and aft or sideways retraction. Compared to a double truck configuration, the present assembly, in which all wheels are effectively rotating about a common axis, provides a high capacity landing gear which requires a relative small storage space.

Also, inasmuch as all wheels are mounted on a common axis, brake snubbing action is greatly minimized or eliminated. As is well-known, braking reaction on double trucks results in one or more moments about the main strut pivot, which must be snubbed by shock absorbers or the like. The present invention greatly minimizes such snubbing.

In addition, anti-shimmy damping is provided by a friction couple inherent in the geometry of the center wheel projected bearing area. Analytically, this couple may be defined and evaluated by the expression $C = \mu Pl$, where $\mu$ is the coefficient of friction, P is the load on the center wheel and $l$ is the couple distance for an elliptical footprint area ($l$ is approximately .5 of the major axis length). This means that the center wheel resists the tendency of the assembly to oscillate about the fork-strut axis. In other words, without the center wheel the two outer wheels would have a tendency to oscillate (shimmy) and some type of damping is normally used to resist the inherent shimmy. However, in the present invention the contact area of the center wheel provides a friction couple which eliminates substantially the need for separate damping.

While a specific embodiment of the invention has been shown and described it should be understood that certain alterations, modifications and substitutions may be made to the instant disclosure without departing from the spirit and scope of the invention as defined by the appended claims.

I claim:
1. An aircraft landing gear comprising a landing gear strut for attachment to an aircraft, a fork-like axle supporting member attached to said strut, hollow lateral extensions on the outer sides of the lower extremities of the fork member, a tie-rod member extending through said hollow extensions, and lying in the same plane as said extensions, an axle mounted on said tie-rod between said fork members, and wheel assemblies removably mounted on said axle and each extension.

2. In combination, a three wheel mounting structure comprising a fork member for attachment to a supported structure, an axle extending laterally from each lower extremity of said fork and integrally therewith, each axle having a hollow bore extending therethrough, a third hollow axle between said lower extremities of the fork, means extending through the hollow bores of each named axle for maintaining alignment of said axles and individual wheel assemblies mounted on each axle.

3. The combination defined in claim 2 and further including means for rigidly attaching said third axle to said fork member to prevent relative rotation therebetween.

4. The combination as defined in claim 2, wherein said means extending through said bores consists essentially of a tie-rod and sleeve assembly adapted for insertion in the bores from either direction.

References Cited in the file of this patent
UNITED STATES PATENTS

| | | |
|---|---|---|
| 2,266,924 | Tway | Dec. 23, 1941 |
| 2,538,389 | Smith | Jan. 16, 1951 |
| 2,602,612 | Zimmerman | July 8, 1952 |
| 2,602,635 | Young | July 8, 1952 |
| 2,620,235 | Butler | Dec. 2, 1952 |